(12) United States Patent
Wolf

(10) Patent No.: US 6,584,243 B2
(45) Date of Patent: Jun. 24, 2003

(54) SWITCHING DEVICE FOR AN OPTICAL TRANSMISSION NETWORK

(75) Inventor: Michael Joachim Wolf, Mundelsheim (DE)

(73) Assignee: Alcatel, Paris (FR)

( * ) Notice: Subject to any disclaimer, the term of this patent is extended or adjusted under 35 U.S.C. 154(b) by 20 days.

(21) Appl. No.: 10/021,354

(22) Filed: Dec. 19, 2001

(65) Prior Publication Data

US 2002/0085792 A1 Jul. 4, 2002

(30) Foreign Application Priority Data

Dec. 28, 2000 (DE) .......................................... 100 65 499

(51) Int. Cl.⁷ ................................................ G02B 6/26
(52) U.S. Cl. .............................. 385/16; 385/17; 385/23
(58) Field of Search ....................................... 385/16–24

(56) References Cited

U.S. PATENT DOCUMENTS 6,366,716 B1 * 2/2002 Graves ........................ 385/17

* cited by examiner

Primary Examiner—Phan T. H. Palmer
(74) Attorney, Agent, or Firm—Sughrue Mion, PLLC

(57) ABSTRACT

A switching device (10) for an optical transmission network is provided with a first switch (17) to which a plurality of fibers (11, 12, 13, 14) are attached, each of which fibers (11, 12, 13, 14) is provided with a plurality of channels (16) with different wavelengths. The first switch (17) is suitable for connecting each channel (16) of each of the fibers (11, 12, 13, 14) to any other channel (16) of the fibers (11, 12, 13, 14). At least one channel (16') of the fibers (11, 12, 13, 14) is not attached to the first switch (17), but is instead attached to a second switch (19). The second switch (19) is in this case suitable only for connecting each channel (16') of a first of the fibers (11, 12, 13, 14) to each channel (16') of a second of the fibers (11, 12, 13, 14).

3 Claims, 2 Drawing Sheets

SWITCHING DEVICE FOR AN OPTICAL TRANSMISSION NETWORK

The present invention is based on a priority application DE 100 65 499.1, which is incorporated by reference herein.

FIELD OF THE INVENTION

The invention relates to the field of telecommunications and more particularly to a switching device for an optical transmission network, having a first switch to which a plurality of fibres are attached, each of which fibres is provided with a plurality of channels with a different wavelength, the first switch being suitable for connecting each channel of each of the fibres to any other channel of all the fibres.

BACKGROUND OF THE INVENTION

Such a switching device is known, for example, as a digital cross-connect switch (DXC) in the case of a wavelength division multiplex (WDM) transmission network. The switching device can be embodied therein as an electrical or optical switching matrix, with which each channel of any fibre can be connected to each channel of all the other fibres.

The consequence of the greatly increasing number of channels to be switched on the individual fibres is that the number of possible switching connections in the switching device connecting the fibres is also increasing drastically. This large number of possible switching connections can no longer be achieved realistically with the known switching device.

BRIEF DESCRIPTION OF THE INVENTION

It is an object of the invention to provide a switching device for an optical transmission network, which permits a large number of switching connections to be achieved expediently.

This object is achieved according to the invention, in the case of a switching device of the type mentioned at the start, by the fact that at least one channel of the fibres is not attached to the first switch, but is instead attached to a second switch, the second switch being suitable only for connecting each channel of a first of the fibres to each channel of a second of the fibres.

On the one hand, the switching device according to the invention is no longer suitable for each channel of any fibre to be connected to each channel of all the other fibres. Nevertheless, this can be readily compensated for by the fact that, with the aid of a network management system, the entire transmission network, or the connections set up thereby, can be globally controlled.

On the other hand, the essential advantage of the switching device according to the invention resides in its low component cost. Owing to the fact that it is no longer necessary to connect each channel to all the other channels, a substantially simpler and therefore less expensive first switching matrix can be used. Those channels which are not attached to this switching matrix can be connected to one another with the aid of a second switching matrix, which is likewise relatively simple and inexpensive. Overall, the outlay for the two switching matrices according to the invention is then substantially less than for an switching matrix according to the prior art, with which each channel can be connected to all the other channels.

In an advantageous refinement of the invention, at least one channel of the fibres is attached neither to the first switch nor to the second switch, but is instead attached to an amplifier, the amplifier being suitable only for connecting each channel of a first of the fibres to the associated channel, with the same wavelength, of a second of the fibres.

With the aid of the amplifier, a signal to be transmitted can therefore easily be amplified within the switching device according to the invention. Nevertheless, in this refinement of the invention as well, it is readily possible to set up any desired connection within the transmission network with the aid of the network management system.

Other features, possible applications and advantages of the invention will be found in the following description of exemplary embodiments of the invention, which are represented in the figures of the drawing. In this context, all described or presented features, individually or in any combination, constitute the subject-matter of the invention, irrespective of their summary in the patent claims or the referencing thereof, and irrespective of their formulation or presentation in the description and/or in the drawing.

DETAILED DESCRIPTION OF THE INVENTION

Figure 1:
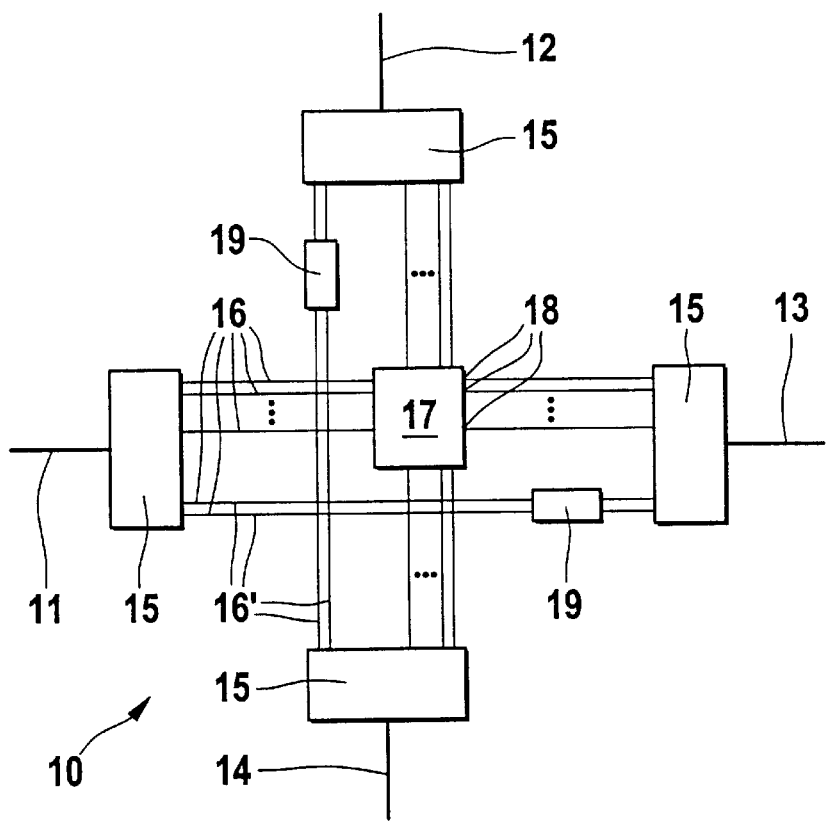
FIG. 1 shows a schematic block diagram of a first exemplary embodiment of a switching device according to the invention.

FIG. 1 represents a digital switching device 10, which is intended to connect four optical fibres 11, 12, 13, 14 to one another. The switching device 10 may in this case be designed as an electrical switch or as an optical switch. The switching device 10 constitutes a so-called "digital cross-connect switch (DXC)".

In the fibres 11, 12, 13, 14 attached to the switching device 10, optical signals can be transmitted on a plurality of channels 16. In this context, the channels which are present differ by the wavelength. In FIG. 1, this is expressed by the fact that the fibres 11, 12, 13, 14 can be allotted to the individual channels 16 with the aid of multiplex devices 15, the channels 16 of each of the fibres 11, 12, 13, 14 differing by their wavelength. In particular, the fibres 11, 12, 13, 14 belong to a so-called wavelength division multiplex (WDM) transmission network.

The switching device 10 has a first switch 17, in which each attached input 18 can be connected to any other attached input 18. The switch 17 is preferably designed as an switching matrix. With the aid of the switch 17, each incoming channel 16 can be arbitrarily forwarded on the output side. The wavelength of the forwarded channel 16 may in this case also be modified.

Each channel 16 which belongs to the fibre 11 and is connected to the switch 17 can therefore be connected to each channel 16 which belongs to one of the fibres 12, 13, 14 and is also connected to the switch 17. The same applies to each of the channels 16 of the fibres 12, 13, 14.

Not all the channels 16 belonging to the fibres 11, 12, 13, 14 are attached to the first switch 17. Instead, some of the channels 16 are not connected to the switch 17 at all. These channels 16 bypass the switch 17. For illustrative purposes, these channels 16 are additionally marked by the reference numbers 16' in FIG. 1.

The channels 16' which belong to the two fibres 11 and 13 and are not attached to the first switch 17 are connected to one another through a second switch 19. The same applies to the channels 16' of the two fibres 12 and 14. The switches 19 are preferably designed as switching matrixes. With the aid of the switch 19, the wavelength of an incoming channel 16' can be modified to a different wavelength on the output side. The connection between the respective fibres 11 and 13, or 12 and 14, then remains unmodified.

Figure 2:
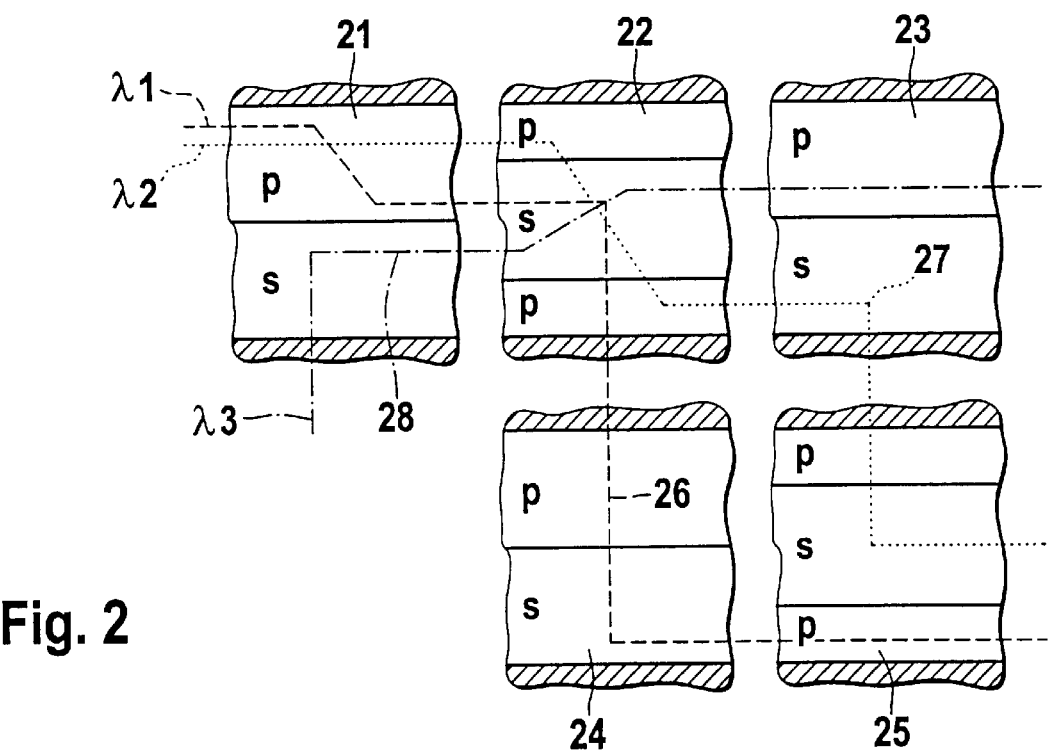
FIG. 2 shows a schematic representation of connections by means of switching devices according to FIG. 1.

FIG. 2 schematically represents exemplary connections which can be set up with the aid of a plurality of the switching devices 10 of FIG. 1. Each of the three columns of the blocks 21, 22, 23, 24, 25 shown in FIG. 2 is in this case produced by means of one switching device 10.

The blocks 21, 23, 24 are subdivided into two regions, which are denoted by the references s and p. Accordingly, the blocks 22, 25 are subdivided into three regions s and p. The blocks 21, 22, 23, 24, 25 represent the fibres 11, 12, 13, 14 as a function of the wavelength of the channels 16 which are present. The regions s and p of the blocks 21, 22, 23, 24, 25 have in this case different wavelengths.

The regions s ("switch") always relate to channels 16 which are attached to the first switch 17, and which can therefore be arbitrarily forwarded. The region p ("pass") always relates to channels 16 which are not attached to the first switch 17, although their wavelength can be modified by means of the second switch 19.

In the regions s of the blocks 21, 22, 23, 24, 25 of FIG. 2, a connection can be routed from one block to any other block. In practical terms, this constitutes arbitrary forwarding of a channel 16 from one of the fibres 11, 12 and 13, 14 to another fibre in FIG. 1. In the regions p of FIG. 2, it is only possible to modify the wavelength of the channel 16, this being represented in FIG. 2 by an appropriately modified arrangement of the respective connection.

The regions s and p of mutually adjacent blocks 21, 22, 23; 24, 25 are designed differently with regard to their wavelengths, and are arranged at least partially overlapping.

A first connection 26 is represented by dashes in FIG. 2. In the first block 21, the wavelength λ1 of the channel 16 belonging to this connection is modified in such a way that this modified wavelength is allocated, in the subsequent block 22, to one of those channels 16 which can be arbitrarily forwarded. The connection 26 therefore belongs to the region p in block 21, but to the region s in block 22.

In block 22, the connection 26 is then forwarded to another fibre. This is done by routing the connection 26 out of block 22 and into block 24. In block 24, the connection 26 again belongs to the region s. From block 24, the connection 26 is then sent to the region p of block 25.

Overall, the channel 16, with wavelength λ1, of a first fibre (represented by block 21) is therefore forwarded to an arbitrary second fibre (represented by block 24).

A second connection 27 is represented by dots in FIG. 2. For this connection 27, the wavelength λ2 of the associated channel 16 is first modified in block 22. In block 23, the connection 27 is then forwarded to block 25. The channel 16 of wavelength λ2 is therefore forwarded from block 21 to block 25.

A third connection 28 is represented by dots and dashes in FIG. 2. For this connection 28, the channel 16 with a wavelength λ3 is introduced into the region s of block 21. In block 22, the wavelength is modified inside the region s, in such a way that the channel 16 is then assigned to the region p in block 23. In block 22, the channel 16 is hence forwarded via the associated first switch 17 whereas, in block 23, the channel 16 bypasses the associated first switch 17.

The switching device 10 of FIG. 1 can be imagined as a motorway junction. There is through traffic, which is embodied in FIG. 2 by the regions p ("pass") of the individual blocks. There is also branching traffic, which is embodied in FIG. 2 by the regions s ("switch") of the individual blocks. The through traffic can change to the branching traffic, which corresponds to a wavelength modification in FIG. 2. In the switching device 10, it is necessary to control a connection between particular channels 16 of particular fibres 11, 12, 13, 14 with the aid of a network management system. This management system need not in this case set up the desired connections in the sense of successive point-to-point subconnections, but instead it is necessary to supervise the constraints on the forwarding of connections due to the regions s and p.

Figure 3:
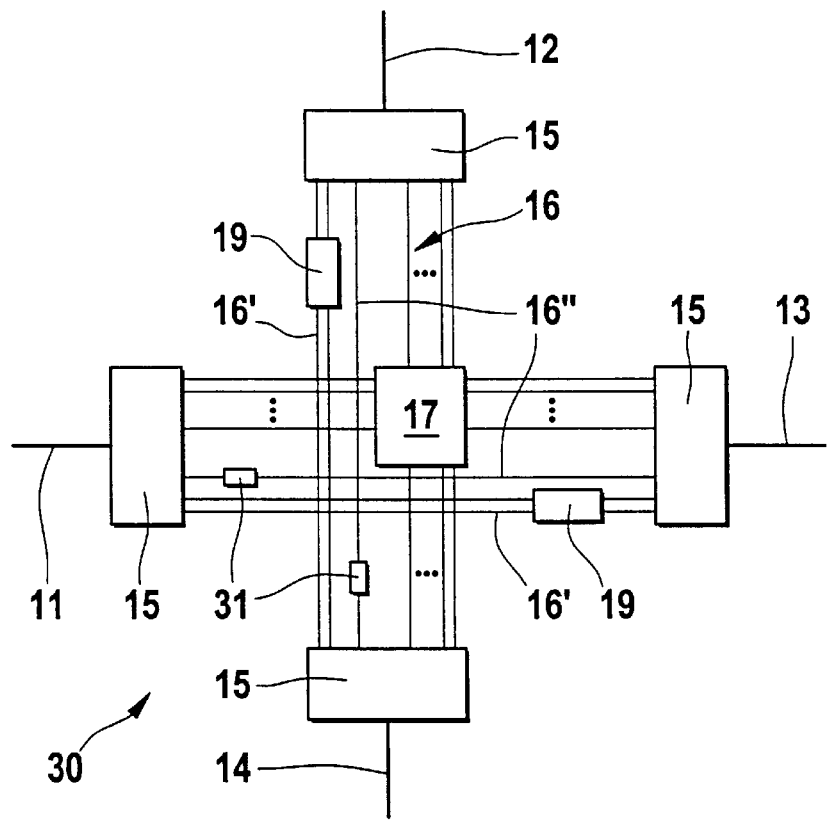
FIG. 3 shows a schematic block diagram of a second exemplary embodiment of a switching device according to the invention.

FIG. 3 represents a switching device 30 which substantially corresponds to the switching device 10 of FIG. 1. Components which correspond to one another are therefore marked with the same reference numbers.

In comparison with FIG. 1, the switching device 30 of FIG. 3 has additional channels 16", which are connected neither to the first switch 17 nor to the second switch 19. Rather, these channels 16" contain no switches within the switching device 30, but instead only one amplifier 31 per channel.

Within the channel 16", there is therefore no possibility of forwarding or wavelength modification. Rather, the signal present on the channel 16" is only amplified.

In the motorway analogy which has been described, the channels 16" can be imagined as overtaking lanes. It is not possible to change lane on these overtaking lanes, neither is it possible to branch off.

Figure 4:
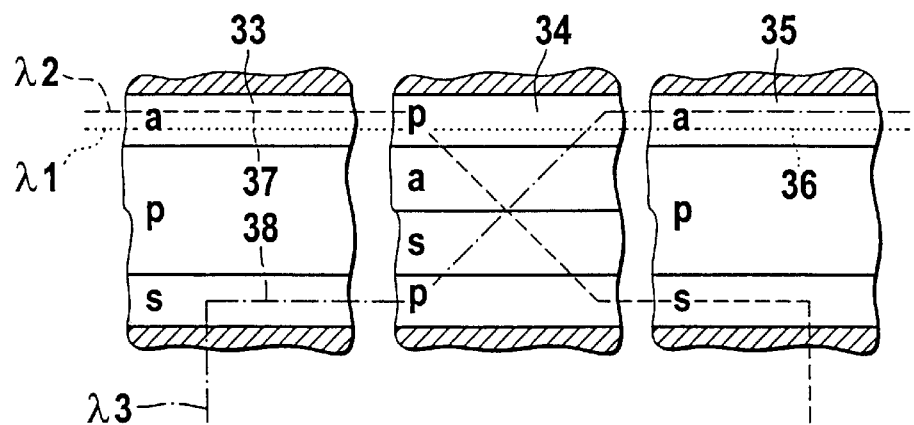
FIG. 4 shows a schematic representation of connections by means of switching devices according to FIG. 3.

FIG. 4 schematically represents exemplary connections which can be set up with the aid of a plurality of the switching devices 30 of FIG. 3. The presentation of FIG. 4 corresponds in this case to the presentation of FIG. 3. Corresponding functions are therefore marked by the same reference numbers.

In FIG. 4, blocks 33, 34, 35 are present. As can be seen from FIG. 4, the blocks 33, 34, 35 contain an additional region a ("amplify"), which is in practical terms assigned to those channels 16" which contain no switches 17 or 19, but instead only the amplifier 32. As can also be seen from FIG. 4, the regions a, p and s are arranged overlapping one another. In particular, the regions a and p respectively alternate in successive blocks 33, 34, 35.

A first connection 26 is represented by dots in FIG. 4. This connection 36 denotes a channel 16 which is located in the region a in block 33, in the region p in block 34 and again in the region a in block 35. This channel 16 is therefore amplified in every second successive block 33, 35, and needs to pass through only a small number of switches 19 in block 34. The channel 16 has the wavelength λ1, which cannot be modified.

A second connection 37 is represented by dashes in FIG. 4. The channel 16 of this connection 37 has the wavelength λ2. It is located in the region a in block 33, and then changes to the region p in block 34. For the connection 37 in the region p of block 34, it is therefore possible to modify the wavelength of the channel 16. The consequence of this is that the channel 16 of the connection 37 is located in the region s in block 35, so that it can be sent arbitrarily to another block.

A third connection 38 is represented by dots and dashes in FIG. 4. For this connection 38, the channel 16 with a wavelength λ3 is introduced into the region s of block 33. In block 34, the wavelength is modified within the region p, in such a way that the channel 16 is then assigned to the region a in block 35. Overall, the channel 16 was therefore firstly introduced from an arbitrary different block, so that it can be assigned to the region a of block 35.

What is claimed is:

1. A switching device for an optical transmission network, having a first switch to which a plurality of fibres are attached, each of which fibres is provided with a plurality of channels with different wavelengths, the first switch being suitable for connecting each channel of each of the fibres to any other channel of the fibres, wherein at least one channel of the fibres is not attached to the first switch, but is instead attached to a second switch, the second switch being suitable only for connecting each channel of a first of the fibres to each channel of a second of the fibres.

2. A switching device according to claim 1, wherein at least one channel of the fibres is attached neither to the first switch nor to the second switch, but is instead attached to an amplifier, the amplifier being suitable only for connecting each channel of a first of the fibres to the associated channel, with the same wavelength, of a second of the fibres.

3. A management system for controlling a plurality of switching devices according to claim 1, wherein, when setting up a connection, the management system takes into account the various possibilities for the switching-through of channels by the switching devices.

* * * * *